United States Patent [19]

Xanthopoulo

[11] B 4,014,843

[45] Mar. 29, 1977

[54] LATEX COMPOSITIONS

[75] Inventor: Valentino George Xanthopoulo, Sarnia, Canada

[73] Assignee: Polysar Limited, Sarnia, Canada

[22] Filed: Apr. 30, 1975

[21] Appl. No.: 573,114

[44] Published under the second Trial Voluntary Protest Program on April 6, 1976 as document No. B 573,114.

Related U.S. Application Data

[63] Continuation-in-part of Ser. No. 367,504, June 6, 1973, abandoned, which is a continuation-in-part of Ser. No. 141,433, May 7, 1971, abandoned.

[52] U.S. Cl. .................. 260/29.7 T; 260/29.7 P; 260/29.7 SQ; 260/29.7 NQ; 260/29.7 SE; 260/29.7 N; 260/29.7 NE; 260/29.7 E; 260/29.7 PT; 526/193; 526/214; 526/217; 526/225; 526/234; 526/273; 526/311; 526/331; 526/338

[51] Int. Cl.$^2$ .................. C08L 9/00; C08L 9/04; C08L 9/08; C08L 25/14

[58] Field of Search ............... 260/29.7 E, 29.7 H, 260/29.7 PT, 29.7 T, 29.7 P, 29.7 SQ, 29.7 NQ, 29.7 SE, 29.7 N, 29.7 NE, 80.7, 80.78, 80.81, 82.1, 82.5, 82.7, 83.1, 83.3, 83.5, 84.3, 84.7, 85.1

[56] References Cited

UNITED STATES PATENTS

| | | | |
|---|---|---|---|
| 3,288,741 | 11/1966 | Cheng | 260/29.7 |
| 3,330,795 | 7/1967 | Schluter | 260/29.7 |
| 3,409,569 | 11/1968 | Lane et al. | 260/8 |

OTHER PUBLICATIONS

Union Carbide Publication, *Carbowax Polyethylene Glycols*, pp. 2, 3, 6–16, 19, 20.

Blackley, *High Polymer Latices*, I, pp. 121–122, (Applied Science, 1966).

*Primary Examiner*—Murray Tillman
*Assistant Examiner*—T. De Benedictis, Sr.
*Attorney, Agent, or Firm*—Stevens, Davis, Miller & Mosher

[57] ABSTRACT

High solids latex suitable for no-gel foam applications is prepared by polymerizing an aliphatic conjugated diolefin, optionally with at least one copolymerizable monomer e.g. styrene, acrylonitrile or vinylidene chloride, in an aqueous emulsion containing less than 6 parts by weight per 100 parts monomers of a polymerization promoting synthetic emulsifier system e.g. sodium alkyl sulfate or ether sulfate and/or sodium sulfosuccinate and from about 0.001 to less than 0.2 parts by weight of a water dispersible agglomerating agent comprising the reaction product of a polyoxyalkylene glycol having a molecular weight of at least 5,000 with the polyepoxide obtained by reacting epichlorohydrin with a polyhydric phenol.

The latex is stable and can be compound with fillers and then frothed in the absence of gelling agents to produce a uniform foam.

9 Claims, No Drawings

LATEX COMPOSITIONS

This application is a continuation-in-part of application Ser. No. 367,504 filed June 6, 1973, which was a continuation-in-part of application Ser. No. 141,433 filed May 7, 1971, both applications now abandoned.

This invention relates to a process of producing a high solids latex and to foamable latex compositions produced thereby.

High solids latices are used in the production of latex foam products. Two basic methods are known for the preparation of such latices. One method involves polymerizing at a slow rate monomers such as butadiene and styrene in an aqueous emulsion containing a small amount of a fatty acid soap and as the reaction proceeds incrementally adding more soap so as to maintain a stable emulsion. The polymerization reaction is long, between about 30 and 50 hours, and requires careful attention; productivity per reactor is very low and the cost is high.

The other method involves the steps of (1) polymerizing, (2) agglomerating and (3) concentrating. The polymerization step is simple and fast but produces a latex of less than about 35% solids which is not suitable for the production of high solids latex without the intervening agglomeration step. The agglomeration is achieved by freezing and thawing or by subjecting the latex to high shearing forces. After the agglomeration, the latex is concentrated to at least 55% solids. The additional steps of agglomeration and concentration detract from the economics of this second method.

An object of this invention is to provide a process of producing a high solids latex in a simple polymerization system that does not require increment additions of emulsifiers, monomers or other reaction components. Another object is to provide a polymerization system that permits the use of an all synthetic emulsifier. A further object of this invention is to provide a foamable high solids latex that is sufficiently stable to be foamed and dried to produce a uniform cellular structure.

This invention provides a high solids latex foamable to a stable froth comprising at least 55% by weight of a non-volatile material dispersed in an aqueous phase in the form of latex particles, said material being essentially a high molecular weight synthetic polymer of a monomer mixture containing 30–100% by weight of an aliphatic conjugated $C_4$-$C_8$ diolefin and 0–70% by weight of at least one copolymerizable compound, said aqueous phase containing less than about 6% by weight, based on the weight of polymer, of a polymerization promoting emulsifier system comprising (1) an alkali metal salt of an alkyl sulfate, alkoxyalkyl sulfate or alkoxyalkyl phosphate, said salt (1) having a critical micelle concentration from about 0.002% to about 0.15% or (2) an alkali metal salt of sulfosuccinic acid or an amine derivative of sulfosuccinic acid, said acids having a hydrocarbyl substituent attached to an oxygen atom or a nitrogen atom, or a partial alkali metal salt of N-alkyl beta imino dicarboxylic acid, said salt (2) having a critical micelle concentration from about 0.01% to 1.0%, and about 0.001 to less than 0.20 part of an agglomerating agent as hereinafter described.

The present invention also provides a process of producing a high solids latex foamable to a stable froth which comprises polymerizing 100 parts by weight of a monomer mixture of (a) 30–100% by weight of an aliphatic conjugated $C_4$-$C_8$ diolefin and (b) 0–70% by weight of at least one copolymerizable compound, said monomer mixture being emulsified in less than 140 parts by weight of an aqueous phase containing less than 6 parts by weight of (A) a polymerization promoting emulsifier system consisting of (1) an alkali metal salt of an alkyl sulfate, alkoxyalkyl sulfate or alkoxyalkyl phosphate having a critical micelle concentration from about 0.002% to about 0.15% or (2) an alkali metal salt of sulfosuccinic acid or an amine derivative of sulfosuccinic acid having a hydrocarbyl substituent attached to an oxygen atom or a nitrogen atom, or a partial alkali metal salt of N-alkyl beta imino dicarboxylic acid, said salt (2) having a critical micelle concentration of about 0.01 – 1.0 and (B) 0.001 to less than 0.2 parts by weight of a water dispersible agglomerating agent comprising the reaction product of a polyoxyalkylene glycol having a molecular weight of at least 5,000 with the polyepoxide obtained by reacting epichlorohydrin with a polyhydric phenol, said reaction product having a molecular weight of 5,000–50,000 and preferably about 15,000 to 20,000, said polymerization being carried out to at least 65% conversion to form a stable fluid latex and concentrating said latex to a solids level of at least 55%.

The latex of this invention is made in an emulsion polymerization system. Monomers are emulsified in an aqueous phase containing a polymerization promoting emulsifier and the reaction is initiated by the addition of a catalyst. A wide variety of monomers can be used provided they product a polymer which is film forming at temperatures of up to about 100°C. It is preferable to use one or more monomers which polymerize to give elastomeric polymers. Representative examples of such polymers are homopolymers of butadiene-1,3, isoprene or other aliphatic conjugated $C_4$-$C_8$ diolefins, copolymers of two or more of the above diolefins and copolymers of at least about 30% by weight of at least one of the above conjugated diolefins with not more than about 70% of at least one of a copolymerizable compound. The copolymerizable compound is an olefinically unsaturated compound of vinyl, vinylidene or vinylene type represented by styrene, alphamethyl styrene, vinyl toluene, acrylonitrile, methacrylonitrile, alkyl acrylates such as ethyl acrylate, butyl acrylate, alkyl methacrylates such as methyl methacrylate, vinyl pyridine, vinyl acetate, vinylidene chloride and similar compounds or mixtures thereof. In addition to the above olefinically unsaturated compounds, there can be also used small amounts of a second copolymerizable compound selected from olefinically unsaturated carboxylic acids, half esters of unsaturated dicarboxylic acids and unsaturated carboxylic acid amides and mixtures thereof. Representative examples of such second compounds are acrylic acid, methacrylic acid, itaconic acid, maleic acid, fumaric acid, acrylamide, methacrylamide and amides of itaconic acid. The amount of the second copolymerizable compound is preferably 0.5–30% by weight of the total mixture of compounds to be copolymerized with the aliphatic conjugated diolefin. The most preferred monomer composition for latex foam products is a carboxyl free mixture of 50–90% butadiene-1,3 and 10–50% styrene.

The monomers are emulsified in a small amount of an aqueous phase of less than 140 parts and preferably between 60 and 100 parts per 100 parts by weight of monomer. The aqueous phase contains two essential components: (A) a polymerization promoting emulsifier system and (B) a water dispersible agglomerating agent.

The emulsifier system is used in an amount of less than 6 parts by weight per 100 parts of monomers. As little as about 1 part of the emulsifier system can be used, although it is preferred to operate at about 2–4 parts per 100 parts of monomer. The emulsifier system used in this invention is made of at least one surfactant selected from two groups of synthetic surfactants.

The first group includes alkali metal salts of alkyl sulfates, alkoxyalkyl sulfates (alkyl ether sulfates) and alkoxyalkyl phosphates (alkyl ether phosphates). The alkyl or alkoxy groups preferably contain from about 10 to 20 carbon atoms. The length of the alkyl groups is reflected in the critical micelle concentration which ranges from about 0.002% to about 0.15%. It is preferred to use surfactants having a critical micelle concentration from about 0.01% to about 0.1%. Representative examples of such surfactants are sodium lauryl sulfate, sodium capryl sulfate, sodium myristyl sulfate, sodium ether sulfate of a $C_{12}$-$C_{18}$ straight chain alcohol, sodium lauryl ether phosphate and corresponding potassium salts.

The second group of surfactants includes alkali metal salts of sulfosuccinic acid or amine derivatives of sulfosuccinic acid having a hydrocarbyl or oxygenated hydrocarbyl substituent attached either to oxygen atom or nitrogen atom and partial alkali metal salts of N-alkyl beta imino dicarboxylic acids. The size of the hydrocarbyl substituent may vary from about 6 to about 20 carbon atoms. Depending on the size and number of hydrocarbyl substituents, the critical micelle concentration of the second surfactant may range from about 0.01% to about 1.0%, preferably between 0.03% and 0.3%. Representative examples of such surfactants are dihexyl ester of sodium sulfosuccinic acid, dioctyl ester of sodium sulfosuccinic acid, dilauryl ester of sodium sulfosuccinic acid, disodium salt of ethoxylated $C_{10}$-$C_{14}$ alcohol half ester of sulfosuccinic acid, disodium salt of N-octadecyl sulfosuccinamate, disodium salt of N-hexadecyl sulfosuccinamate, tetrasodium salt of N-(1,2 dicarboxy ethyl) N-octadecyl sulfosuccinamate, sodium salt of a dioctyl sulfosuccinamate, partial salt of N-lauryl beta imino dipropionate and the corresponding potassium salts.

For a proper balance of the desired properties in the foamable high solids latex of this invention, it is preferred to use a mixture of at least two surfactants, most preferably one surfactant from each of the above two groups. Representative examples of the mixed emulsifier system are sodium lauryl sulfate-disodium salt of N-octadecyl sulfosuccinamate, sodium lauryl sulfate-sodium lauryl ether phosphate, disodium salt of N-octadecyl sulfosuccinamate-dihexyl ester of sodium succinate. The ratio may vary within wide limits from about 80/20 to 20/80. It is preferred to use a mixture of surfactants, at least one of which has a critical micelle concentration from about 0.01% to about 0.15%.

The second essential component of the aqueous phase according to this invention is a water dispersible agglomerating agent prepared by first reacting epichlorohydrin with a polyhydric phenol to form a dipeoxy polymer where the epoxy groups are in the terminal positions on the polymer molecules, and then reacting this diepoxide with a polyoxyalkylene glycol to form the agglomerating agent having a molecular weight of about 5,000 to 50,000 and preferably about 15,000 – 20,000. The polyhydric phenol is preferably a p,p'-alkylidene diphenol such as 2,2-bis-(4-hydroxy phenyl)-propane, butane or pentane etc., and the preferred polyoxyalkylene glycol is polyoxyethylene glycol having a molecular weight of about 6,000. In the most preferred agglomerating agent, the polyhydric phenol is 2,2-bis-(4-hydroxy phenyl)-propane. A material available commercially from Union Carbide Corporation under the Trademark CARBOWAX 20M and having an average molecular weight of about 20,000 is a compound of this type and works very effectively. It may be used in an amount of about 0.001 part to less than 0.2 parts per 100 parts of monomers, but preferably less than 0.1 part either alone or in mixture with polyvinyl alcohol, polyvinyl pyrrolidone or other hydrophilic emulsion stabilizers. The agglomerating agent increases the average size of latex particles from about 600 A to over 1000 A and produces a stable latex with a higher soap coverage.

In addition to the above essential components, the aqueous system may contain conventional additives: electrolytes and buffers such as KCl, $K_2CO_3$, $Na_2CO_3$, $Na_3PO_4$, $Na_4P_2O_7$, $K_4P_2O_7$; dispersing agents such as sodium salts of a polymer of an aryl sulfonate and formaldehyde; sequestering agents such as alkali metal salt of ethylene diamino tetraacetic acid; and non-ionic emulsifiers such as fatty acid alkanol amides.

The polymerization reaction is initiated by the addition of a catalyst. It may be a catalyst of the Redox type consisting of an organic peroxide and a water dispersible reducer such as ferrous sulfoxylate complex or an inorganic percompound such as potassium persulfate, hydrogen peroxide, sodium perborate and the like. With the catalyst of the Redox type, the reaction may be carried out at a temperature between 0°C and about 40°C. When the inorganic percompound is used, the reaction temperature is maintained about 30°C and preferably from about 50°C to about 80°C.

The reaction is carried out in one or more agitated reactors such as are conventionally used in the production of synthetic rubber latices. It may be either a continuous process or a discontinuous one. The reaction proceeds generally at a fast rate and preferably reaches a conversion of at least 65% in less than about 24 hours. Longer reaction times can also be used although they are economically less attractive. The resulting latex is then stripped of the residual monomers and, if the solids level of the stripped latex is too low, the latex is concentrated in a conventional equipment to a solids content of at least 55%, preferably between 60% and about 70%.

If desired, the concentrated latex may be mixed with an additional emulsifier, either of the same type as used in the polymerization or a different one. When used for the preparation of latex foam products in the absence of gelling agents, the latex is compounded with up to 300 parts per 100 parts of latex solids of a filler, such as ground limestone, hydrated alumina, aluminum silicate or other conventional fillers, emulsifiers, thickening agents and vulcanizing agents and the compound is frothed. The froth is then spread on a substrate such as carpet backing and dried to form a solid foam which subsequently may be heat treated to complete vulcanization. In the process of producing no-gel latex foam, it is desired to have as little emulsifier as possible so as to minimize the detackifying action of the emulsifier. The foamable high solids latex of this invention has the advantage over the prior art latices in that it contains a lower content of the total emulsifier of which less than 6% by weight of polymer is a synthetic emulsifier capable of foaming and forming a stable latex froth even at a pH below 7.

The latex is a high solids large particle size latex, i.e. has at least 55% solids and preferably 60% to about 70% solids at a viscosity of 12 poise. The number average particle size of the latex may vary from about 800 A to about 3000 A, but preferably is between about 1000 A and 2000 A. The volume average particle size of the latex may range from about 1300 A to about 5000 A, but preferably is between about 1600 A to 3000 A.

The invention is further illustrated by the following examples.

EXAMPLE 1

A series of three polymerization experiments were carried out in 1 liter crown capped pressure bottles using the following basic recipe in parts by weight:

| | |
|---|---|
| Butadiene | 73 |
| Styrene | 27 |
| t-dodecyl mercaptan | 0.12 |
| Water | 100 |
| Emulsifier system* | 3.5 |
| Dispersing agent** | 0.8 |
| Na$_3$PO$_4$ | 0.2 |
| KCl | 0.4 |
| Sequestering agent*** | 0.04 |
| CARBOWAX 20M | variable |
| K$_2$S$_2$O$_8$ | 0.3 |

*50/50 mixture of disodium N-octadecyl sulfosuccinamate (CMC 0.05%) and sodium lauryl sulfate (CMC 0.011%)
**sodium salt of a polymer naphthalene sulfonate and formaldehyde
***ethylene diamino tetraacetic acid The bottles were charged as follows: styrene and mercaptan were added first, then followed by the aqueous phase containing the emulsifier system, dispersing agent, electrolytes, sequestering agent, the agglomeration system and the persulfate. An excess of butadiene was charged next and the excess was allowed to evaporate at room temperature and displace the air from the gaseous phase in the bottle. The bottle was then capped and placed in a 50°C water bath on a rotating rack and rotated for about 18 hours.

The results of the polymerization experiments are presented in Table I. The first experiment was a control experiment and was carried out not in accordance with this invention.

TABLE I

| Bottle | Control | 1 | 2 |
|---|---|---|---|
| Agglomerating System (parts) | | | |
| CARBOWAX 20M | 0 | 0.001 | 0.008 |
| Polyvinyl alcohol* | 0 | 0.05 | 0.05 |
| Conversion (%) | 88 | 89 | 86 |
| 80 Mesh Coagulum (%) | 8.7 | <0.1 | <0.1 |
| Particle Size (number average) (A) | 680 | 1040 | 1250 |
| Soap Coverage (%) | 36 | 57 | 71 |

TABLE I-continued

| Bottle | Control | 1 | 2 |
|---|---|---|---|
| Foam Stability** (minutes) | 10.3 | 11.8 | 13.2 |

*available under the trade mark Elvanol 50-42
**expressed as a time at which the rate of separation of the liquid phase from the foamed latex sharply increases by a factor of at least 5

The above data indicate that as little as 0.001 part per 100 parts of monomers of the polyoxyethylene glycol compound effectively agglomerated the latex and 0.05 parts of polyvinyl alcohol practically eliminated coagulum formation. The average particle size increased by more than 50%. Further additions of the polyoxyethylene glycol compound brought about further increase in the average particle size, better soap coverage and foam stability.

EXAMPLE 2

Another series of polymerization experiments was carried out at different temperatures using the recipe of Example 1 except for the agglomerating system which was held constant at 0.0025 part of the agglomerating compound and 0.05 parts of polyvinyl alcohol. The emulsifier system in this series consisted of a mixture of 1.5 parts of sodium lauryl sulfate and 2.0 parts of sodium lauryl ether phosphate (CMC 0.00225%). In the experiment carried out at 13°C, the catalyst of the basic recipe was replaced by a Redox system consisting of:

0.15 parts by weight of a diisopropyl benzene monohydroperoxide, and 0.004 parts of a ferrous sulfoxylate complex.

The results are presented in Table II. A control experiment containing no agglomerating system is included for comparison.

TABLE II

| Bottle | 1 | 2 | 3 | Control (no agglomerant) |
|---|---|---|---|---|
| Reaction Temperature (°C) | 13 | 50 | 50–63 | 50 |
| Reaction Time (hours) | 28 | 18 | 18 | 18 |
| Conversion (%) | 72 | 70 | 90 | 85 |
| 80 Mesh Coagulum (%) | <0.1 | <0.1 | <0.1 | 4.3 |
| Soap Coverage (%) | 67 | 63 | 53 | 43 |
| Particle Size (number average) (A) | 1040 | 960 | 1035 | 780 |
| Foam Stability (minutes) | 7.9 | 8.6 | 9.3 | 6.9 |

The above table shows again that all experiments made in the presence of the agglomerating system produced more stable latices than the control experiment. It also shows that a good foamable high solids latex can be produced at a low temperature of 13°C using a Redox catalyst and at elevated temperatures using potassium persulfate catalyst. It is worth noting that as the temperature increases, soap coverage of the latex decreases but foam stability increases.

EXAMPLE 3

The effect of varying water charge on the polymerization of butadiene and styrene was investigated in a series of two polymerization batches made in a 20 gallon glass lined reactor provided with a turbine type agitator rotated at a rate 110 R.P.M.

The monomers were dispersed and polymerized in an aqueous medium consisting of (in parts by weight per 100 parts of monomers):

| | |
|---|---|
| Emulsifier System | |
| Sodium lauryl sulfate | 0.8 |

-continued

| | |
|---|---|
| Disodium N-octadecyl sulfosuccinamate | 3.2 |
| Agglomerating Agent CARBOWAX 20M | 0.006 |
| $Na_3PO_4$ | 1.2 |
| Sequestering Agent* | 0.04 |
| Dispersing Agent | 0.5 |
| $K_2CO_3$ | 0.6 |
| $K_2S_2O_8$ (catalyst) | 0.3 |
| Water | variable |
| Reaction Temperature | 55°C |
| Reaction Time | 16 hours |

*ethylene diamino tetraacetic acid

The reaction was interrupted by the addition of 0.1 part of diethyl hydroxylamine stopper. The stopped polymerization product was freed of the residual monomer by steam stripping and then vacuum concentrated to above 20 poise viscosity. The resulting latices were tested for coagulum, surface tension and average particle size and the results are presented in Table III.

TABLE III

| Run No. | 6843 | 6856 |
|---|---|---|
| Water (parts by weight) | 90 | 75 |
| Conversion (%) | 86 | 86 |
| Reactor Fouling | nil | nil |
| Concentrated Latex Properties | | |
| 80 Mesh Coagulum (%) | <0.01 | <0.01 |
| pH | 10.9 | 10.2 |
| Solids (%) | 64.3 | 58.6 |
| Surface Tension (dynes/cm²) | 47.0 | 42.2 |
| Particle Size (number average) (A) | 1083 | 1226 |
| Soap Coverage (%) | 67 | 76 |

The above data show that as the water was decreased, the average particle size and soap coverage increased. The reaction rate and latex stability were not affected.

EXAMPLE 4

A series of 20 gallon polymerization batches was prepared with different amounts of electrolytes. The basic polymerization recipe was the same as in Example 3 except for the variable electrolytes instead of 1.2 parts of $Na_3PO_4$ and 0.6 parts of $K_2CO_3$ and the water charge was maintained constant at 80 parts. The polymerization reaction, stripping, concentration and latex testing were performed as in Example 3. The experimental data are presented in Table IV.

TABLE IV

| Run No. | 6869 | 6921 | 6937 | 6943 |
|---|---|---|---|---|
| $Na_3PO_4$ (parts) | 0.5 | — | — | — |
| $K_4P_2O_7$ (parts) | — | 0.5 | 0.2 | — |
| $K_2CO_3$ (parts) | 0.6 | — | — | — |
| Reaction Time (hours) | 15½ | 17½ | 14¼ | 13½ |
| Conversion (%) | 84 | 85 | 84 | 84 |
| Solids (%) | 48.7 | 48.7 | 48.1 | 48.5 |
| Coagulum in Stripped Latex (%) | 1.0 | 0.8 | 0.3 | 0.2 |
| Reactor Fouling | nil | nil | nil | nil |
| Properties of Concentrated Latex | | | | |
| 80 Mesh Coagulum (%) | <0.01 | 0.014 | <0.01 | <0.01 |
| pH | 10.1 | 7.0 | 6.6 | 6.0 |
| Solids (%) | 63.8 | 60.5 | 63.3 | 61.7 |
| Brookfield Viscosity (poise) | 10.4 | 24.0 | 18.4 | 22.5 |
| Surface Tension (dynes/cm²) | 48.8 | 49.6 | 44.0 | 46.0 |
| Particle Size (number average) (A) | 1135 | 1020 | 1124 | 1084 |
| Soap Coverage (%) | 72 | 64 | 73 | 68 |
| Stability to High Speed Agitation (gram of coagulum) | — | 0.013 | 0.031 | <0.01 |

The above table shows that the reaction time decreased as the amount of electrolytes was reduced. Contrary to expectations, this change did not significantly affect the latex stability or particle size.

No-gel spread foam samples were prepared from the latices of Runs 6921, 6937 and 6943 in the following manner. Each of these latices adjusted to a pH of about 8 was compounded with 4 parts of sodium lauryl sulfate (the usual amount of a foamable surfactant used in the prior art no-gel latices), 150 parts of ground calcium carbonate and a vulcanization system consisting of 2 parts zinc dibutyl dithiocarbamate, 5 parts zinc oxide and 2 parts of sulfur. The compounds were frothed and expanded to a foam having a density of 0.2 gms/cm³. The foam was spread on a coated carpet to a thickness of about 0.5 cm, exposed to infra-red heat for 1 minute and then vulcanized at 150°C for 20 minutes. The vulcanized foam samples were examined for foam uniformity and the appearance of the foam surface. Foamability and filler acceptance were also noted during compounding and frothing and the qualitative results are presented in Table V.

TABLE V

| Latex | 6921 | 6937 | 6943 |
|---|---|---|---|
| Filler Acceptance | excellent | good | fair |
| Foamability | excellent | good | fair |
| Foam Surface | poor | excellent | fair |
| Foam Uniformity | good | excellent | poor |

The high amount of sodium lauryl sulfate used in the above compounds was not essential; it was rather detrimental since it affected the rate of curing and the cohesive strength of the cured foam as observed in the tendency of the foam to delaminate at about the center plane of the cured foam layer. It was found that at the above filler loading, about 1–2 parts of sodium lauryl sulfate per 100 parts of latex solids was sufficient to maintain foamability and foam stability of the latex compound.

Instead of sodium lauryl sulfate, it is possible to use fatty acid soap such as potassium oleate or potassium palmitate alone or in combination with the above sodium lauryl sulfate or sodium salt of a polymer of alkyl aryl sulfonate and formaldehyde. The optimum amount of surfactants used in latex compounding depends on the amount of filler used and the degree of foaming; less than 1 part of potassium oleate was required when the latex compound contained less than 50 parts of fillers and was foamed to a density of not less than 0.4.

EXAMPLE 5

Six emulsifier systems were tested essentially using the polymerization recipe of Example 1 except for the agglomerating system which was maintained constant as in Example 2 and the catalyst system which was the same as in Bottle 1 of Example 2. The reaction was carried out at a temperature of 13°C for about 25 hours.

The results are presented in Table VI.

TABLE VI

| Bottle | 1 | 2 | 3 | 4 | 5 | 6 |
|---|---|---|---|---|---|---|
| Emulsifier System (parts) | | | | | | |
| Sodium Lauryl Sulfate | 3.5 | 2.8 | 1.4 | — | 0.8 | 2.75 |
| Disodium N-octadecyl Sulfosuccinamate | — | 0.7 | 2.1 | 3.5 | 3.2 | — |
| Sodium Lauryl Ether Phosphate | — | — | — | — | — | 1.25 |
| Conversion (%) | 68 | 67 | 70 | 74 | 85 | 85 |
| 80 Mesh Coagulum (%) | <0.1 | <0.1 | <0.1 | 1.0 | <0.01 | <0.01 |
| Soap Coverage (%) | 75 | 77 | 72 | 64 | 78 | 75 |
| Average Particle Size (A) (number average) | 1095 | 1110 | 1085 | 1015 | 1240 | 1200 |
| Foam Stability (minutes) | 8.1 | 8.6 | 10.6 | 11.5 | 11.5 | 8.3 |
| Foamability (seconds to volume) | — | — | — | — | 97 | 13 |

The above table shows that high solids foamable latices were produced with the emulsifier system varied from the 100% lauryl sulfate type to the 100% sulfosuccinamate type. The former produced a latex of good stability and fairly good foamability; the latter resulted in a latex of poorer latex stability but better foamability and foam stability. In the presence of both surfactants, stable and foamable latices of good quality were obtained. The latices of Bottles 5 and 6 were compounded and frothed using the recipe and procedure as described in Example 4. No-gel foam samples were tested for density, delamination strength and surface appearance. The results are presented in the table below.

| | Latex 5 | Latex 6 |
|---|---|---|
| Density (gms/cm$^3$) | 0.216 | 0.212 |
| Delamination Strength (gms/cm) | 190 | 158 |
| Foam Surface | excellent | good |

EXAMPLE 6

A series of five polymerization experiments was carried out with different monomers using the recipe as shown in Example 3 except for electrolytes and water. Instead of 1.2 parts of $Na_3PO_4$ and 0.6 parts of $K_2CO_3$, the electrolytes used in this series consisted of 0.2 parts of $K_4P_2O_7$ and 0.6 parts of $K_2SO_4$. The water charge was 80 parts. The experiments were done in 1 liter crown capped bottles at 50°C as described in Example 1.

The results are shown in Table VII.

TABLE VII

| Bottle | 1 | 2 | 3 | 4 | 5 |
|---|---|---|---|---|---|
| Monomers (parts) | | | | | |
| Butadiene | 100 | 60 | 60 | 64.25 | 59.25 |
| Styrene | — | 38 | 30 | 13 | — |
| Methacrylic Acid | — | 2 | — | — | — |
| Acrylonitrile | — | — | 10 | — | — |
| Vinylidene Chloride | — | — | — | 22 | 40 |
| Acrylamide | — | — | — | 0.75 | 0.75 |
| Reaction Time (hours) | 22 | 18½ | 12½ | 17¾ | 28½ |
| Conversion (%) | 82 | 84 | 83 | 83 | 87 |
| 80 Mesh Coagulum (%) | <0.01 | 0.90 | <0.01 | <0.01 | <0.01 |
| Properties of Concentrated Latex | | | | | |
| Solids (%) | 60.6 | 57.9 | 61.4 | 62.0 | 64.3 |
| Brookfield Viscosity (poise) | 15.2 | 12.7 | 8.7 | 15.5 | 11.9 |
| Surface Tension (dynes/cm$^2$) | 51.9 | 41.2 | 46.0 | 53.9 | 49.1 |
| pH | 6.3 | 6.95 | 6.25 | 6.35 | 6.13 |
| 80 Mesh Coagulum (%) | <0.01 | 0.1 | <0.01 | <0.01 | <0.01 |

The latices produced in Bottles 1 and 3-5 were very stable and showed a viscosity of less than 15 poise at about 60% solids. The carboxylic latex contained some coagulum that was formed during polymerization but on stripping and concentrating in the presence of added ammonia, a high solids latex was obtained which was readily foamable to a stable foam. The average particle size in Bottle 3 was 1230 A.

The concentrated latices of Bottles 3, 4 and 5 were compounded using the following recipe, in parts by weight:

| | |
|---|---|
| Latex | 100 |
| Potassium oleate | 1.5 |
| Zinc dibutyl dithiocarbamate | 2.5 |
| Alkylated phenol antioxidant | 1.5 |
| Zinc oxide | 5.0 |
| Carbon black | 0.5 |
| Ground limestone | 100 |
| Sulfur | 2 |
| Total solids | 71.2 |

The compounds were frothed and expanded to a density of 0.2 grams/cm$^3$ and the foam was spread on a textile substrate to a thickness of about 0.5 cm, then heated by infra-red light for 1 minute and cured at 150°C for 20 minutes.

The cured foam was tested for physical properties and the results are presented in Table VIII.

TABLE VIII

| Latex | 3 | 4 | 5 |
|---|---|---|---|
| pH | 10.0 | 9.7 | 9.8 |
| Compound Viscosity (poise) | 22.5 | 37.5 | 27.5 |
| Foam Density (gms/cm³) | 0.3 | 0.25 | 0.28 |
| Compression Set (%) | 6 | 7 | 5 |
| Compression Resistance (kg/cm²) | 0.38 | 0.27 | 0.35 |
| Tensile Strength (kg/cm²) | 0.85 | 1.0 | 1.2 |
| Elongation (%) | 90 | 130 | 80 |

EXAMPLE 7

Two concentrated latex samples were prepared using the polymerization recipe and procedure essentially as described in Example 4. The samples differed in the amount of the copolymerized styrene: Latex 1 contained 30% styrene and Latex 2 40% styrene. Otherwise, the samples were similar: they had a solids content of 65.7 ± 0.2%, pH of 6.5, Brookfield viscosity of 13.5 poise, surface tension of 47.2 ± 0.2 dyne/cm², particle size of 1225 ± 20 A and showed a soap coverage of 76% and a good stability to high speed agitation (less than 0.01 grams of coagulum).

The latices were compounded using the following formulation, in parts by weight, per 100 parts of latex solids:

| | |
|---|---|
| Latex | 100 |
| KOH to adjust to a pH of 8 | |
| Alkylated phenol antioxidant | 1.0 |
| Zinc dibutyl dithiocarbamate | 2.0 |
| Zinc oxide | 5.0 |
| Ground limestone | 150 |
| Carbon black | 1.0 |
| Sodium lauryl sulfate | 1.5 |
| Sulfur | 2.0 |

The compounds were frothed, spread on a carpet and given 60 seconds infra-red heat and then placed in a laboratory oven for 20 minutes at 150°C. The cured foam samples were tested and the results are presented in Table IX.

TABLE IX

| Latex | 1 | 2 |
|---|---|---|
| Wet Foam Density (gms/cm³) | 0.44 | 0.405 |
| Dry Density (gms/cm³) | 0.24 | 0.25 |
| Compression Resistance (kg/cm²) | 0.50 | 0.46 |
| Compression Set (%) | 2.4 | 2.2 |
| Delamination Strength (kg/cm) | 0.3 | 0.38 |

The above foam samples had a uniform foam structure and good surface appearance and their physical properties were also good.

What is claimed is:

1. A process of producing a high solids latex foamable to a stable froth which comprises polymerizing 100 parts by weight of a monomer mixture of (a) 30–100% by weight of an aliphatic conjugated $C_4$-$C_8$ diolefin and (b) 0–70% by weight of at least one copolymerizable compound, said monomer mixture being emulsified in less than 140 parts by weight of an aqueous phase containing less than 6 parts by weight of (A) a polymerization promoting emulsifier system consisting of (1) an alkali metal salt of an alkyl sulfate, alkoxyalkyl sulfate or alkoxyalkyl phosphate having a critical micelle concentration from about 0.002% to about 0.15% or (2) an alkali metal salt of sulfosuccinic acid or an amine derivative of sulfosuccinic acid having a hydrocarbyl substituent attached to an oxygen atom or a nitrogen atom, or a partial alkali metal salt of N-alkyl beta imino dicarboxylic acid, said salt (2) having a critical micelle concentration from about 0.01% to about 1.0% and (B) from about 0.001 to less than 0.1 part by weight of a water dispersible agglomerating system comprising the reaction product of a polyoxyalkylene glycol having a molecular weight of at least 5,000 with the polyepoxide obtained by reacting epichlorohydrin with a polyhydric phenol, said reaction product having a molecular weight of about 15,000 – 20,000, said polymerization being carried out to at least 65% conversion to form a stable fluid latex and concentrating said latex to a solids level of at least 55%.

2. The process according to claim 1 in which the monomer mixture consists of 50–90% by weight of butadiene-1,3 and 10–50% by weight of at least one compound selected from styrene, alphamethyl styrene, vinylidene chloride, acrylonitrile, methacrylonitrile, methyl methacrylate and mixtures thereof.

3. The process according to claim 1 in which the monomer mixture consists of 50–90% by weight of butadiene-1,3 and 10–50% by weight of a mixture of 70–99.5% by weight of a compound selected from styrene, alphamethyl styrene, vinylidene chloride, acrylonitrile, methacrylonitrile, methyl methacrylate and mixtures thereof and 0.5–30% by weight of a second copolymerizable compound selected from olefinically unsaturated carboxylic acid and olefinically unsaturated carboxylic acid amides.

4. The process according to claim 1 in which 60–100 parts of aqueous phase are employed.

5. The process according to claim 1 in which the agglomerating agent has a molecular weight of about 15,000 – 20,000 and is the reaction product of a polyoxyethylene glycol of molecular weight of about 6,000 with the polyepoxide obtained by reacting epichlorohydrin with 2,2-bis-(4-hydroxy phenyl)-propane.

6. A high solids latex foamable to a stable froth comprising at least 55% by weight of non-volatile material dispersed in an aqueous phase in the form of latex particles, said material being essentially a high molecular weight synthetic polymer of a monomer mixture containing 30–100% by weight of an aliphatic conjugated $C_4$-$C_8$ diolefin and 0–70% by weight of at least one copolymerizable compound, said aqueous phase containing (A) less than about 6% by weight, based on the weight of the polymer, of a polymerization promoting emulsifier system comprising a member selected from the group consisting of (1) an alkali metal salt of an alkyl sulfate, alkoxyalkyl sulfate or alkoxyalkyl phosphate, said salt (1) having a critical micelle concentration from about 0.002% to about 0.15% and (2) an alkali metal salt of sulfosuccinic acid or an amine derivative of sulfosuccinic acid, said acid having a hydrocarbyl substituent attached to an oxygen atom or a nitrogen atom, or a partial alkali metal salt of N-alkyl beta imino dicarboxylic acid, said salt (2) having a critical micelle concentration from about 0.01% to about 1.0%, and (B) from about 0.001 to less than 0.1 by weight, based on the weight of the polymer, of a water dispersible agglomerating system comprising the reaction product of a polyoxyalkylene glycol having a molecular weight of at least 5,000 with the polyepoxide obtained by reacting epichlorohydrin with a polyhydric phenol, said reaction product having a molecular weight of about 15,000 – 20,000.

7. A high solids latex according to claim 6 in which the monomer mixture consists of 50–90% by weight of butadiene-1,3 and 10–50% by weight of at least one compound selected from styrene, alphamethyl styrene, vinylidene chloride, acrylonitrile, methacrylonitrile, methyl methacrylate and mixtures thereof.

8. A high solids latex according to claim 6 in which the monomer mixture consists of 50–90% by weight of butadiene-1,3 and 10–50% by weight of a mixture of 70–99.5% by weight of a compound selected from styrene, alphamethyl styrene, vinylidene chloride, acrylonitrile, methacrylonitrile, methyl methacrylate and mixtures thereof and 0.5–30% by weight of a second polymerizable compound selected from olefinically unsaturated carboxylic acids and olefinically unsaturated carboxylic acid amides and mixtures thereof.

9. A high solids latex according to claim 6 in which the agglomerating agent is the reaction product of a polyoxyethylene glycol of molecular weight of about 6,000 with the epoxide obtained by reacting epichlorohydrin with 2,2-bis-(4-hydroxy phenyl)-propane.

* * * * *